United States Patent [19]

Craig

[11] Patent Number: 5,403,392
[45] Date of Patent: Apr. 4, 1995

[54] HIGH SOLIDS AQUEOUS DISPERSIONS OF HYDROPHOBIZING AGENTS

[75] Inventor: Daniel H. Craig, Niskayuna, N.Y.

[73] Assignee: Ennis Herder, Inc., Schenectady, N.Y.

[21] Appl. No.: 101,844

[22] Filed: Aug. 4, 1993

[51] Int. Cl.$^6$ .................................... C09D 105/00
[52] U.S. Cl. .................................... 106/162
[58] Field of Search .................................... 106/162

[56] References Cited

U.S. PATENT DOCUMENTS

| | | |
|---|---|---|
| 2,627,477 | 2/1953 | Downey . |
| 3,432,319 | 3/1969 | Jakaitis et al. . |
| 3,442,676 | 5/1969 | Belfort . |
| 3,931,069 | 11/1976 | Lundin . |
| 4,296,012 | 10/1981 | Okumichi et al. . |
| 4,654,375 | 3/1987 | Malwitz .................... 100/162 |
| 5,013,775 | 5/1991 | Oikawa et al. . |
| 5,028,236 | 4/1991 | Kortmann et al. . |

FOREIGN PATENT DOCUMENTS

| | | |
|---|---|---|
| 57-101095 | 5/1982 | Japan . |
| 57-101096 | 5/1982 | Japan . |
| 57-112498 | 7/1982 | Japan . |
| 57-112499 | 7/1982 | Japan . |
| 58-087395 | 5/1983 | Japan . |
| 58-087396 | 5/1983 | Japan . |
| 58-091894 | 5/1983 | Japan . |
| 58-091895 | 5/1993 | Japan . |

OTHER PUBLICATIONS

Hauek, "Waterproofing and Water/Dil Repellancy", Encyclopedia of Chemical Technology, vol. 24 pp. 442 through 465 (1984).

Griffin, "Emulsions", Encyclopedia of Chemical Technology, vol. 8 pp. 900 through 930 (1979).

McIlroy, "Plant Glycodies", Chapters 6 and 9, Edward Arnold and Co. (1951).

Kaufmann and Steinkoenig, "Saponins and Sapognins", Encyclopedia of Chemical Technology, vol. 12, pp. 96 through 105 (1954).

Applegate, "Fats and Fatty Oils", Encyclopedia of Chemical Technology vol. 9, pp. 795 through 831 (1980).

Letcher, "Waxes", Encyclopedia of Chemical Technology vol. 24, pp. 466 through 481 (1984).

Warson, "The Applications of Synthetic Resin Emulsions", Ernest Benn Limited (1972) (no month avail).

Cottrell and Biard, "Gums", Encyclopedia of Chemical Technology, vol. 12, pp. 45 through 66 (1980).

Teot, "Resin, Water-Soluble", Encyclopedia of Chemical Technology, vol. 20, pp. 207 through 230 (1982).

Primary Examiner—David Brunsman

[57] ABSTRACT

Stable high solids aqueous dispersions of hydrophobizing agents can be prepared utilizing plant glycosides as the primary dispersion stabilizer and, optionally, secondary dispersion stabilizers. These dispersions impart water repellent characteristics when applied to the interfaces and surfaces of materials, and are compatible when blended with synthetic resin emulsions.

20 Claims, No Drawings

HIGH SOLIDS AQUEOUS DISPERSIONS OF HYDROPHOBIZING AGENTS

This invention relates to high solids aqueous dispersions of hydrophobizing agents, to methods of their preparation, and to aqueous blends of such dispersions. The high solids dispersions of this invention impart hydrophobic characteristics to the interfaces of materials onto which they are applied, are stable to storage, and are compatible with a variety of other aqueous systems when blended therewith.

BACKGROUND OF INVENTION

Hydrophobizing agents are widely used as water repellent materials to impart water resistance to such compositions as textiles, carpet fibers, paper and paperboard, when applied thereon. Many materials are known in the art to be useful as hydrophobizing agents for water repellency applications including organometallic complexes, waxes and wax-metal emulsions, resin-based finishes, silicones, rosin, hexadecylketene dimers, and fluoro chemicals, to name a few. A general review of the many types of water repellent chemicals useful as hydrophobizing agents is provided by M. Hayek in the *Encyclopedia of Chemical Technology*, Volume 24, (1984), "Waterproofing and Water/Oil Repellency" pages 442 through 465, and is incorporated herein by reference.

It is well known in the art that many hydrophobizing agents can be stabilized in aqueous dispersion form by the presence of surfactants, usually fatty acid salts, or salts of sulfated fatty alcohols, in order to facilitate their handling and application onto materials, especially at surfaces or at interfaces, for the purpose of imparting water repellency. Such dispersions typically contain relatively high concentrations of surfactant and/or protective colloids as dispersion stabilizers, typically greater than 10% by weight based on hydrophobizing agent, the presence of which surfactants or protective colloid dispersion stabilizers, while providing the necessary colloidal stability for practical preparation of such aqueous dispersions, and while providing the necessary surface activity to ensure deposition of the hydrophobizing agent at surfaces or interfaces, detracts from the repellency properties desired upon final application. This results from the presence of the usually hygroscopic surfactant or protective colloid dispersion stabilizer in the resulting water repellent layer, which promotes aqueous rewetting and swelling of the deposited hydrophobizing agent. In the case of reactive hydrophobizing agents such as fatty acid anhydrides, hexadecylketene dimer, and alkenylsuccinic anhydrides, capable of forming covalent bonds with active hydrogen-containing substrates, the high levels of dispersion stabilizers required for colloidal stability can further interfere with the covalent reactions anchoring the repellent to the substrate, by competing with the substrate for active sites, in addition to the aforementioned rewetting phenomenon. In the case of hydrophobizing agents comprising crystalline waxy materials, such as those selected from the group comprising the various natural, mineral, and synthetic waxes, alkylketene dimers, such as hexadecylketene dimer, and fatty triglycerides such as tristearin or castor wax, or blends of crystalline materials, with themselves or with amorphous hydrophobizing agents, substantially higher levels of dispersion stabilizer are frequently required to offset the pronounced negative effect the crystalline nature of the hydrophobizing agent has on dispersion stability. Indeed, attempts to incorporate even low levels of crystalline materials into aqueous dispersions frequently causes an aqueous dispersion of amorphous hydrophobizing agent to gel upon standing. Thus shipping, storage, and handling requirements require that high levels of dispersion stabilizer be used to ensure sufficient colloidal stability to prevent dispersion flocculation, viscosity build, and eventual gelation or solidification, rendering the dispersion less suitable for practical water repellent applications. Nevertheless, crystalline materials provide a high degree of water repellency and it is frequently a goal of manufacturers of hydrophobizing agent dispersions to blend crystalline materials with less costly amorphous materials to achieve a proper balance of economics and high performance. It is therefore desirable to minimize the presence of dispersion stabilizing additives, such as surfactants or protective colloids, in the final water repellent hydrophobizing agent dispersion, in order to achieve the greatest efficiency of active ingredient utilization.

One method for providing such colloidal stability, in addition to the aforementioned use of high levels of surfactants, has been to prepare the dispersions in relatively dilute form, usually less than 10% to 20%, by weight based on total dispersion, of hydrophobizing agent. While this may provide sufficient stability for many applications, it can also lead to inefficiencies in storage and shipping since the quantity of inactive ingredient, water, becomes excessively large, requiring surplus storage facilities and shipping containers for what amounts to low levels of useful or active ingredient. It is therefore also desirable to maximize the concentration of hydrophobizing agent in the dispersion, to provide the greatest efficiency of storage and least costly method of transport.

One attempt to overcome the disadvantages that high levels of surfactants bring to aqueous wax emulsions is described in U.S. Pat. No. 3,432,319, which discloses paraffin wax emulsion compositions comprising relatively low concentrations of a hydroxyalkyl methylcellulose ether dispersion stabilizer. Several advantages associated with the absence of conventional surfactants and the use of high aqueous concentrations of wax are disclosed including increased mechanical shear stability and increased comparability with urea-formaldehyde resins. However the hydrophobizing wax material is restricted to paraffin wax. Indeed, in contrast to the instant invention, partial or complete substitution of the paraffin wax with crystalline or waxy non-reactive hydrophobic materials, such as beeswax or tristearin, or crystalline reactive waxy materials, such as hexadecylketene dimer, according to said patent, renders the mixtures unemulsifyable or results in dispersions of very limited storage stability. Thus the benefit of the dispersions as disclosed is restricted to those consisting of paraffin waxes.

One attempt at improving the colloidal stability, for storage and handling purposes, of dispersions containing crystalline hydrophobizing agents is disclosed in U.S. Pat. No. 4 296 012 which describes the requirements of utilizing a non-crystalline hydrocarbon resin in combination with a crystalline ketene dimer in order to achieve the appropriate amount of stability in the ketene dimer dispersion, while providing a high degree of sizing effect. However, the dispersions are relatively dilute, typically 15% by weight of total dispersion of non-volatile component and contain a high concentration of dispersion stabilizer, typically greater than 20% by weight based on concentration of hydrophobizing agent. In contrast, the dispersions of the instant invention are stable in the presence of crystalline materials alone, even at concentrations of hydrophobizing agent up to about 40% by weight of total dispersion.

A combination of a cationic dispersing agent and alkyl hydroxyalkyl cellulose, as dispersion stabilizers for substituted ketene dimer dispersions, is disclosed in U.S. Pat. No. 3,931,069. The dispersions are useful for sizing cellulose fibers and contain up to 30%, by weight, of total solids content. However the total solids content represents the combined concentrations of the ketene dimer and the stabilizers, making the highest attainable solids content of the ketene dimer, based on weight of total dispersion, significantly less than 30%. In contrast, the dispersions of the instant invention readily achieve hydrophobizing agent concentrations in excess of 35% to 40% by weight of total dispersion.

Furthermore, it had been disclosed and claimed in U.S. Pat. No. 2,627,477 aqueous emulsions of higher ketene dimers, containing a water-soluble cellulose ether, useful in sizing paper. However the examples teach that very high levels of water-soluble cellulose ether relative to ketene dimer, up to as much as 300% by weight of stabilizer based on ketene dimer or greater, are employed. The resulting dispersions themselves are very dilute, typically 0.5% by weight of ketene dimer based on total dispersion, and describe pre-dissolution of the dimer in an organic solvent. In contrast, the dispersions of the instant invention readily achieve a high degree of stability utilizing dispersions stabilizers at concentrations less than about 2%, by weight, based on hydrophobizing agent, and hydrophobizing agent concentrations up to about 40% by weight of total dispersion.

U.S. Pat. No. 5,013,775 discloses the difficulty associated with preparation of stable high concentration aqueous dispersion sizing agents based on ketene dimer compounds and suggests a solution whereby a composition comprising a hydrophilic copolymer polymerized in the presence of an alkylmercaptan is utilized to stabilize the hydrophobic ketene dimer compounds in aqueous dispersion form. The resulting dispersions are clearly distinguishable from the dispersions of the instant invention in that they typically contain about 20% by weight of ketene dimer of dispersion stabilizer, at total non-volatile solids of 20% by weight of total dispersion U.S. Pat. No. 5,028,236 describes ketene dimer dispersions useful for the treatment of wool and synthetic polyamide fibers The dispersions of said invention are dilute, less than about 10%, by weight of total dispersion, of hydrophobizing agent, and utilize high levels of dispersion stabilizer, typically 8% by weight based on hydrophobizing agent.

Lastly, a detailed description of the complex considerations necessary in the design of stable industrial emulsions, including wax emulsions, is provided by W. C. Griffin, in the *Encyclopedia of Chemical Technology*, Volume 8, (1979), "Emulsions", pages 900 through 930. This reference discloses that wax emulsions, i.e. dispersions, may be stabilized against agglomeration by buffering with an organic ester, although no details are given.

DESCRIPTION OF INVENTION

It is an object of this invention to provide aqueous dispersions of hydrophobizing agents containing low levels of dispersion stabilizers relative to the concentration of hydrophobizing agent, to allow for an increased efficacy of the hydrophobizing agent in its end use application. It is further an object of this invention to provide stable high solids aqueous dispersions of said hydrophobizing agents for the purpose of minimizing secondary costs and inefficiencies associated with dilute dispersions, such as shipping and storage costs. It is still further an object of this invention to provide aqueous dispersions of hydrophobizing agents wherein the hydrophobizing agent can be a blend of different hydrophobic materials, in particular wherein at least one of the blended materials is normally at least partially crystalline at room temperature, in order to allow for the optimization of the water proofing/repellency effect desired. Lastly, it is an object of this invention to provide aqueous dispersions of hydrophobizing agents which are compatible when mixed with synthetic resin emulsions. These and other advantages of the present invention will be made obvious to those skilled in the art from the detailed description provided below.

It has been discovered that stable, high solids aqueous dispersions of hydrophobizing agents can be prepared in the presence of glycoside dispersion stabilizers. This was completely unexpected since glycosides, of which the plant glycoside saponin is a well known example, have been known in the art for a long time to be useful as protective colloid emulsion stabilizers for liquid organic hydrocarbon-based systems, but have not been known to be useful as stabilizers for aqueous dispersions of waxy, crystalline, or reactive hydrophobic materials, which are known to be especially difficult to produce in stable aqueous emulsion form. While a wide range of glycosides are useful for the present invention, preferred are plant glycosides, in particular those plant glycosides whose aglycone portion is structurally related to benzopyrone, including flavone, iso-flavone, flavanol, flavanone, and chalcone glycosides, examples of which include apiin, acaciin, baptisin, genistin, iso-shekanin, avicularin, gossypin, quercetrin, saponarin, citronin naringin, carthamin, plant glycosides whose aglycone portion is structurally related to triterpenoid and steroid-based structures, which materials are known as saponins, examples of which include camellia saponin, glycyrrhizin, quillaia-saponin, and sarsasaponin, and combinations of said benzopyrone-based glycosides and saponins; which examples and further plant glycoside examples are described by R. J. McIlroy in chapters 6 and 9, respectively, of *Plant Glycosides*, Edward Arnold and Co., London (1951), incorporated herein by reference. An additional discussion of possible structures, widespread presence in the plant kingdom, and usefulness of saponins is provided by Kaufmann and Steinkoenig in the *Encyclopedia of Chemical Technology*, Volume 12, (1954), "Saponins and Sapogenins", pages 96 through 105 incorporated herein by reference. Aqueous dispersions based on such glycosides can be obtained with hydrophobizing agent concentrations of up to about 50%, by weight based on total dispersion, more preferably up to about 45%, by weight of total dispersion of said hydrophobizing agent, most preferably up to about 40%, by weight of total dispersion, of said hydrophobizing agent. These dispersions contain up to about 5% by weight based on hydrophobizing agent of plant glycoside, more preferably up to about 2% to about 5% of plant glycoside by weight based on hydrophobizing agent, most preferably less than 1% to about 2% by weight of hydrophobizing agent of dispersion stabilizer, and are stable to storage and pumping. The low concentration of aqueous dispersion stabilizer utilized in the dispersions of this invention provides a dispersion which is also efficient in imparting hydrophobic characteristics to substrates, by circumventing the rewetting of the protective hydrophobic layer resulting from the use of high levels of dispersion stabilizers, and by minimizing competing side reactions in the case of reactive hydrophobizing agents.

It is well known in the art to utilize combinations of dispersion stabilizers in order to fine tune the characteristics of the resulting aqueous dispersion for viscosity and ease of application. Thus, the present invention contemplates additionally dispersions containing glycosides, as primary dispersion stabilizers, in combination with secondary dispersion stabilizers, such as traditional surfactants known in the art, including anionic, cationic, nonionic, and amphoteric surfactants. Particularly useful as secondary dispersion stabilizers are fatty mono- and diglycerides including phosphorylated and sulfated derivatives thereof, at concentrations ranging from 10%, by weight based on glycoside to as much as 200% by weight based on glycoside. Co-surfactants, such as n-hexadecane and fatty alcohols or sterols, in combination with or in place of the aforementioned traditional surfactants, can be used along with the glycoside according to the present invention, to fine tune the properties of a given aqueous dispersion for a specific application. Fatty alcohols such as cetyl alcohol and sterols such as cholesterol have been found to be particularly effective as secondary dispersion stabilizers at concentrations equal to or less than that of the primary stabilizer. It is additionally known in the art to use water-soluble polymers as thickeners, rheology modifiers, and secondary dispersion stabilizers, in combination with primary dispersion stabilizers, such as the glycosides contemplated herein, in order to modify the rheological characteristics of the dispersion, as well as to minimize the concentration of required primary stabilizer necessary to achieve the required dispersion stability. Frequently, the primary stabilizer, while being required for dispersion stability, is costly relative to the dispersed phase, giving incentive to minimize the amount necessary to achieve a desired property. Water-soluble polymers useful in the dispersions of the present invention are the natural and synthetic materials known in the art to provide the aforementioned characteristics, including water-soluble addition polymers and copolymers of vinyl monomers, and semi-synthetic and natural gums. Natural and semi-synthetic polysaccharides such as water-soluble cellulose ethers are particularly useful in combination with glycosides. Water-soluble polymers are useful as secondary stabilizers at concentrations equal to or less than that of the primary stabilizer.

Hydrophobizing agents useful in the dispersions of the present invention are those materials which are non-migratory upon application and which provide some lasting degree of water repellency under ambient conditions, subsequent to application to the surface or available interfaces of a given material. This excludes hydrophobic materials, such as volatile organic compounds, non-reactive low viscosity materials, or solvents for instance, which would not be expected to be substantive to the substrate, either due to volatility or diffusivity, thus preventing the imparting of any lasting water repellency. Suitable examples of hydrophobizing agents include triglycerides, especially normally solid or semi-solid triglycerides such as those derived from animal and plant sources including triglycerides derived from the following fatty acids, lauric, myristic, palmitic, stearic, oleic, linoleic, linolenic, alpha-eleostearic, ricinoleic, behenic, erucic, as well as triglyceride derivatives including hydrogenated triglycerides or saturated triglycerides such as trilaurin, tripalmitin, trimyristin, tristearin, and castor wax, additional examples of which are contained in *Encyclopedia of Chemical Technology*, Volume 9, (1980), "Fats and Fatty Oils", by T. Applegate, pages 795 through 831 the contents of which is incorporated herein by reference; waxes, i.e. materials which are plastic solids at room temperature, but yield low viscosity fluids upon melting, and which may be crystalline or amorphous, comprising such materials as insect and animal waxes including beeswax and spermaceti, vegetable waxes including candelilla wax, carnauba wax, castor wax, and bayberry wax, mineral waxes including montan wax and petroleum waxes, synthetic waxes such as polyethylene waxes and carboxylated polyethylene waxes, and other waxy materials such as fatty acids, fatty acid salts, fatty alcohols, fatty acid amides, fatty acid esters, rosin acids and rosin acid esters, many of these examples being described by C. S. Letcher in *Encyclopedia of Chemical Technology*, Volume 24, (1984), "Waxes", pages 466 through 481, incorporated herein by reference; reactive hydrophobizing agents including alkylketene dimers, carboxylic acid anhydrides, and alkenylsuccinic anhydrides, capable of covalent attachment to a substrate via reaction with active hydrogen containing groups therein; and other suitable reactive or non-reactive hydrophobic materials such as 1-alkenyl olefins, hydrogenated aromatic petroleum hydrocarbon resin, petrolatum, petroleum asphalt, pentaerythritol tetrastearate, petroleum alicyclic hydrocarbon resins, polyethylene-maleic anhydride adducts, contained in *Code of Federal Regulations*, Title 21, Chapter 1, parts 176.170 and 176.180 the details of which are incorporated herein by reference. It is known in the art that a number of these hydrophobizing agents comprise materials which are at least partially crystalline at room temperature. In addition, such hydrophobizing agents can be combined with each other or with other hydrophobic materials, including anti-oxidants, mold release agents, and other processing additives, particularly via blending of the dispersion form of said materials, in order to provide dispersions with further specific advantages for a given application, while retaining the ability to impart water repellency.

Several unexpected but especially useful advantages accrue from the dispersions of the instant invention. First, stable high solids dispersions of reactive crystalline alkylketene dimers can be produced according to the instant invention; something which has heretofore been difficult to achieve, especially at the low levels of dispersion stabilizer utilized according to the instant invention, since ketene dimer compounds are inherently reactive with water yielding non-reactive by-products, leading to inhomogeneities and colloidal instability in the dispersion. Second, stable high solids dispersions of blends of alkylketene dimers with other hydrophobic materials, including, but not to be restricted to, crystalline waxy materials such as saturated triglycerides and waxes, can be produced according to the instant invention, providing an opportunity to fully exploit various combinations of hydrophobizing agents to achieve optimized water repellency for a wide range of substrates. Indeed, in the few instances where alkylketene dimers have been combined with other hydrophobic materials in an aqueous dispersion, only non-crystalline hydrophobizing agents have been blended with the ketene dimers, as disclosed in U.S. Pat. No. 4,296,012, or only very dilute dispersions, such as those compositions assigned to Kao Soap Co., Ltd., in Japanese patents JP 82,101,095; JP 82,101,096; JP 82,112,498; JP 82,112,499; JP 83,087,395; JP 83,087,396; JP 83,091,894; JP 83,091,895; described in *Chemical Abstracts* CA:97:218355u, CA:97:218356v, CA:98:5658d, CA:98:5659e, CA:99:214418k, CA:99:214402a, CA:99:196885d, CA:99:196886e, respectively, incorporated herein by reference; which patents disclose dispersions containing 90.9/9.1 blends of alkylketene dimer with propylene glycol monostearate, sucrose stearate, tristearin, stearate, rice-bran wax, 1,4-butanediol distearate, ethylene glycol distearate, pentaerythritol tetrastearate, respectively, containing about 13% by weight of total dispersion of the blend of hydrophobizing agents, wherein the second component blended with the ketene dimers constitutes less than ten percent of the hydrophobizing agent blend, and wherein the dispersion stabilizer, a surfactant, is utilized at a concentration of about 27% by weight of hydrophobizing agent blend. Thus, the ability of dispersions of the instant invention to incorporate levels of non-reactive crystalline hydrophobic material up to as much as 100% of the total hydrophobizing agent concentration, at high concentrations of hydrophobizing agent based on total dispersion and low concentrations of dispersion stabilizer, stands in distinct contrast to the prior art.

The dispersions of this invention display a high degree of compatibility with other aqueous systems and are readily mixed with synthetic resin dispersions, such as those derived from polyvinyl acetate and related copolymers, acrylic polymers and copolymers, styrene polymers and copolymers, aliphatic hydrocarbon polymers, vinyl halide polymers and copolymers, polyesters, polyamides, aminoplasts, epoxies, silcones, and polyurethanes without loss of stability of the resulting blend. A review of the many types and applications of synthetic resin emulsions, i.e. dispersions, is provided by H. Warson in *The Applications of Synthetic Resin Emulsions*, Ernest Benn Limited, London (1972) the content of which is incorporated herein by reference. For instance, it is often desirable to modify the properties of synthetic resin dispersions with aqueous dispersions of waxes in order to achieve a specific end use property. An example is the known modification of polyvinylidene chloride dispersions with wax emulsions, in order to achieve a lower coefficient of friction and anti-blocking properties in films coated with the polyvinylidene chloride, for use as snack food packaging. Traditional dispersions based on fatty acid surfactants are not compatible with the low pH at which polyvinylidene chloride dispersions are manufactured and processed. The use of said wax emulsions when blended with polyvinylidene chloride dispersions leads to rapid premature gelation of the blend. Wax dispersions made according to this invention are completely compatible with such synthetic resin emulsions, and readily enable both dispersion processability and desired end use properties. Another example is the modification of paper size dispersions with cationic retention aids, in order to further facilitate the incorporation of the size dispersion into cellulose fibers. Frequently, dispersions based on fatty acid surfactants or standard fatty alcohol sulfates coagulate in the presence of these cationic resins. Dispersions made according to this invention are compatible when mixed with aqueous solutions of cationic resins, affording stable mixtures, which can be readily applied for sizing purposes.

The following examples serve to illustrate specific aspects of the instant invention without intending to restrict the scope and spirit of what is claimed. All portions described below are by weight.

EXAMPLE 1

1.5 parts of saponin (Quillaia extract) dissolved in 250 parts of distilled water, and 150 parts hexadecylketene dimer (melting range 43° to 53° C.), a crystalline reactive wax, were mixed and heated to 70° C., with agitation, to melt the wax, homogenized in a Waring blender for 15 seconds, cooled rapidly to room temperature under constant agitation and filtered, affording a homogeneous, fluid, aqueous dispersion containing 37.5%, by weight of total dispersion, of ketene dimer. The dispersion is storage stable for several months at room temperature without visible change in appearance or loss of fluidity. This example illustrates an embodiment of the dispersions of the instant invention wherein the hydrophobizing agent comprises a crystalline reactive wax and wherein the aglycone portion of the plant glycoside comprises a triterpenoid structure.

EXAMPLE 2

1.44 parts of saponin (Saponaria extract) dissolved in 240 parts of distilled water, 0.75 part mixed phosphate esters of mono- and di-glycerides, (Emphos TM D70-30C, Witco Corporation), and 160 parts hexadecylketene dimer (melting range 43° to 53° C.) were mixed and heated to 70° C. to melt the wax, with agitation. The mixture was then homogenized for 15 seconds in a Waring blender, cooled rapidly to room temperature, under constant agitation and filtered, affording a fluid, homogeneous, aqueous dispersion containing 39.8%, by weight of total dispersion, of ketene dimer. The dispersion is storage stable for one month at room temperature without visible change in appearance or loss of fluidity. This example illustrates an embodiment of the dispersions of the instant invention wherein a secondary dispersion stabilizer is utilized and wherein the plant glycoside comprises a benzopyrone-based glycoside.

EXAMPLE 3

1.0 part of saponin (Saponaria extract) dissolved in 240 parts of distilled water, 1.0 part polyvinylpyrrolidone (PVP K-90, GAF Corporation), a synthetic water-soluble polymer, dissolved into the saponin solution, and 160 parts hexadecylketene dimer (melting range 43° to 53° C.) were mixed and heated to 70° C. to melt the wax, with agitation. The mixture was homogenized in a Waring blender for 15 seconds, cooled rapidly to room temperature under constant agitation, and filtered, affording a fluid, homogeneous, aqueous dispersion containing 39.8%, by weight of total dispersion, of ketene dimer The dispersion is storage stable for several months at room temperature without visible change in appearance or loss of fluidity. This example illustrates an embodiment of the dispersions of the instant invention wherein a synthetic water-soluble polymer secondary dispersion stabilizer is utilized.

EXAMPLE 4

1.5 parts saponin (Quillaia extract) dissolved in 250 parts distilled water, 2.5 parts microcrystalline cellulose (Avicel® RC 591F, FMC Corporation) dispersed into the saponin solution, and 150 parts hexadecylketene dimer (melting range 43° to 53° C.) were mixed and heated to 70° C. to melt the wax, with constant agitation. The mixture was homogenized for 15 seconds in a Waring blender, cooled rapidly to room temperature under constant agitation and filtered, affording a fluid, homogeneous aqueous dispersion containing 37.5%, by weight of total dispersion, of ketene dimer. The dispersion was storage stable for several months at room temperature without visible change in appearance or loss of fluidity. This example illustrates an embodiment of the dispersions of the instant invention wherein the secondary dispersion stabilizer comprises a microcrystalline cellulose.

EXAMPLE 5

2.25 parts saponin (Quillaia extract) dissolved in 400 parts distilled water, 4.0 parts microcrystalline cellulose (Avicel® RC 591F, FMC Corporation) dispersed into the saponin solution, and 200 parts paraffin wax (melting point 63° C.) were mixed and heated to 75° C. with constant agitation. The mixture was homogenized for 15 seconds in a Waring blender, cooled rapidly to room temperature under constant agitation and filtered, yielding a fluid homogeneous aqueous dispersion containing 33%, by weight of total dispersion, of paraffin wax. The dispersion was storage stable for several months at room temperature without visible change in appearance or loss of fluidity. This example illustrates an embodiment of the dispersions of the instant invention wherein the hydrophobizing agent is a non-reactive petroleum wax.

EXAMPLE 6

1.5 parts saponin (Quillaia extract) and 0.5 part xanthan gum (KELTROL® F, Kelco Division of Merck & Company), a water-soluble polysaccharide, were dissolved in 450 parts of distilled water, and 150 parts hexadecylketene dimer (melting range 43° to 53° C.) were mixed therein, and heated to 70° C., to melt the ketene dimer, with constant agitation. The mixture was then homogenized for 15 seconds in a Waring blender, cooled rapidly to room temperature under constant agitation, and filtered, affording a fluid, homogeneous aqueous dispersion containing 24.9%, by weight of total dispersion, of ketene dimer. The dispersion is storage stable for several months at room temperature without visible change in appearance or loss of fluidity. This example illustrates an embodiment of the dispersions of the instant invention wherein the secondary dispersion stabilizer comprises a water-soluble polysaccharide.

EXAMPLE 7

1.5 parts saponin (Quillaia extract) and 0.5 part Xanthan gum (KELTROL® F, Kelco Division of Merck and Company) were dissolved in 250 parts distilled water, and a combination of 150 parts paraffin wax (melting point 63° C.) and parts hexadecylketene dimer (melting range 43° to 53° C.) were mixed therein, heated to 75° C., homogenized in a Waring blender for 15 seconds then cooled rapidly to room temperature with constant agitation and filtered. The mixture afforded a fluid, homogeneous aqueous dispersion containing 37.3 %, by weight of total dispersion, of hydrophobizing agent. The dispersion is storage stable for several months at room temperature without apparent loss of fluidity or visible change in appearance. This example illustrates an embodiment of the dispersions of the instant invention wherein a secondary dispersion stabilizer is utilized together with a combination of a non-reactive petroleum wax and a crystalline reactive wax.

EXAMPLE 8

1.0 part saponin (Quillaia extract) and 1.0 part METHOCEL ™ A15LV methyl cellulose (Dow Chemical U.S.A.), a semi-synthetic water-soluble polysaccharide, were dissolved into 400 parts distilled water and mixed with 200 parts hexadecylketene dimer (melting range 43° to 53° C.) and heated to 70° C. with constant agitation. The mixture was then homogenized in a Waring blender for 15 seconds, cooled rapidly to room temperature with agitation, and filtered, yielding a fluid, homogeneous aqueous dispersion containing 33.2%, by weight of total dispersion, of ketene dimer. The dispersion is stable to storage at room temperature for several months without visible change in appearance or loss of fluidity. This example illustrates an embodiment of the dispersions of the instant invention wherein the secondary dispersion stabilizer comprises a semi-synthetic water-soluble polysaccharide.

EXAMPLE 9

The procedure and recipe of EXAMPLE 8 was followed except that 200 parts of hexadecylketene dimer was replaced with a blend of 100 parts of paraffin wax (melting point 63° C.), and 100 parts of hexadecylketene dimer (melting range 43° to 53° C.), and the resulting mixture heated to 75° C. prior to homogenization. The resulting dispersion contained 33.2%, by weight of total dispersion, of a 50/50 blend of paraffin wax and hexadecylketene dimer. The dispersion is stable to storage at room temperature for several months without visible change in appearance or loss of fluidity. This example illustrates an embodiment of the dispersions of the instant invention wherein the hydrophobizing agent comprises a blend of a non-reactive petroleum wax with a crystalline reactive wax.

EXAMPLE 10

2.5 parts of saponin (Quillaia extract), 0.5 parts cetyl alcohol, a water-insoluble co-surfactant, and 400 parts of distilled water were mixed and heated to 75° C. to melt the cetyl alcohol, at which time 200 parts paraffin wax (melting point 63° C.) was added. The mixture was heated back to 75° C., homogenized in a Waring blender for 15 seconds, cooled rapidly to room temperature with agitation and filtered, yielding a fluid, homogeneous aqueous dispersion containing 33.1%, by weight of total dispersion, of paraffin wax. The dispersion is stable to storage at room temperature for several months without visible change in appearance or loss of fluidity. This example illustrates an embodiment of the dispersions of the instant invention wherein the hydrophobizing agent comprises a non-reactive petroleum wax and a water-insoluble co-surfactant is utilized.

EXAMPLE 11

2.25 parts of saponin (Quillaia extract),
0.75 parts cetyl alcohol,
4.0 parts microcrystalline cellulose (Avicel® RC591F, FMC Corporation), and 400 parts distilled water were mixed and heated to 75° C., at which time 200 parts tristearin (melting range 55° to 72° C.), a non-reactive fatty triglyceride, was added and the mixture heated to 85° C., homogenized in a Waring blender for 15 seconds, cooled slowly to room temperature with agitation and filtered, yielding a fluid, homogeneous aqueous dispersion containing 33%, by weight of total dispersion, of tristearin. The dispersion is stable to storage indefinitely at room temperature without visible change in appearance or loss of fluidity. This example illustrates an embodiment of the dispersions of the instant invention wherein the hydrophobizing agent comprises a non-reactive crystalline high melting fatty material.

EXAMPLE 12

3 parts of the dispersion described in EXAMPLE 6 was blended with
100 parts of a 50% aqueous dispersion of vinylidene chloride/methyl methacrylate copolymer with slow stirring. The blend was stable to storage at room temperature and could be readily coated onto polyolefin film. This example illustrates the compatibility of the dispersions of the instant invention with synthetic resin emulsions.

EXAMPLE 13

50 parts of the dispersion described in EXAMPLE 1 and
50 parts of a 5% by weight aqueous solution of cationic starch (Amaizo 2187, American Maize Corp.) were stirred together at room temperature. The resulting blend was stable to storage prior to application to cellulose fibers. This example illustrates the compatibility of the dispersions of the instant invention with cationic water-soluble polymers.

The dispersions of this invention efficiently impart water repellency to substrates onto which they are applied, as well as to films cast from synthetic resin emulsions modified through blending with said dispersions. It will be obvious to those skilled in the art that many modifications can be made to the instant invention, specific descriptions of which were not included in the written disclosure of said instant invention, without departing from the spirit and scope of what is claimed below.

What I claim is:

1. A composition of matter which is an aqueous hydrophobizing agent dispersion comprising:
   a) from 0.05% up to about 5% by weight of hydrophobizing agent of a plant glycoside dispersion stabilizer,
   b) optionally, a secondary dispersion stabilizer,
   c) from 0.1% up to about 50% by weight of total dispersion of a hydrophobizing agent, and
   d) water.

2. The composition of claim 1 wherein the aqueous hydrophobizing agent dispersion comprises from 0.1% up to about 40% by weight of total dispersion of a hydrophobizing agent selected from the group comprising fatty hydrophobizing agents, waxy hydrophobizing agents, and blends of said hydrophobizing agents.

3. The composition of claim 2 wherein the plant glycoside is selected from the group comprising glycosides whose aglycone portion is selected from the group comprising benzopyrone-based, triterpenoid-based, and steroid-based structures.

4. The composition of claim 3 wherein a secondary dispersion stabilizer is selected from the group comprising water-soluble polymers and co-surfactants.

5. The composition of claim 1 wherein the aqueous hydrophobizing agent dispersion comprises from 0.1% up to about 40% by weight of total dispersion of a hydrophobizing agent selected from the group comprising hydrophobizing agents which are normally at least partially crystalline at room temperature and blends of said hydrophobizing agents with each other and with non-crystalline hydrophobizing agents.

6. The composition of claim 5 wherein the plant glycoside is selected from the group comprising glycosides whose aglycone portion is selected from the group comprising benzopyrone-based, triterpenoid-based, and steroid-based structures.

7. The composition of claim 6 wherein a secondary dispersion stabilizer is selected from the group comprising water-soluble polymers and co-surfactants.

8. The composition of claim 1 wherein the aqueous hydrophobizing agent dispersion comprises from 0.1% up to about 40% by weight of total dispersion of a hydrophobizing agent selected from the group comprising reactive hydrophobizing agents and blends of reactive hydrophobizing agents with each other and with non-reactive hydrophobizing agents.

9. The composition of claim 8 wherein the plant glycoside is selected from the group comprising glycosides whose aglycone portion is selected from the group comprising benzopyrone-based, triterpenoid-based, and steroid-based structures.

10. The composition of claim 9 wherein a secondary dispersion stabilizer is selected from the group comprising water-soluble polymers and co-surfactants.

11. The composition of claim 1 wherein the plant glycoside is selected from the group comprising glycosides whose aglycone portion is selected from the group comprising benzopyrone-based, triterpenoid-based, and steroid-based structures.

12. The composition of claim 11 wherein a secondary dispersion stabilizer is selected from the group comprising water-soluble polymers and co-surfactants.

13. A method for producing a stable aqueous hydrophobizing agent dispersion comprising:
   a) from 0.05% up to about 5% by weight of hydrophobizing agent of a plant glycoside dispersion stabilizer,
   b) optionally, a secondary dispersion stabilizer,
   c) from 0.1% up to about 50% by weight of total dispersion of a hydrophobizing agent, and
   d) water;

which comprises dispersing said hydrophobizing agent into water in the presence of said plant glycoside and, optionally, said secondary dispersion stabilizer.

14. The method of claim 13 wherein the hydrophobizing agent is selected from the group comprising fatty hydrophobizing agents, waxy hydrophobizing agents, and blends of said hydrophobizing agents.

15. The method of claim 14 wherein the plant glycoside is selected from the group comprising glycosides whose aglycone portion is selected from the group comprising benzopyrone-based, triterpenoid-based, and steroid-based structures.

16. The method of claim 13 wherein the hydrophobizing agent is selected from the group comprising hydrophobizing agents which are normally at least partially crystalline at room temperature and blends of said hydrophobizing agents with each other and with non-crystalline hydrophobizing agents.

17. The method of claim 16 wherein the plant glycoside is selected from the group comprising glycosides whose aglycone portion is selected from the group comprising benzopyrone-based, triterpenoid-based, and steroid-based structures.

18. The method of claim 13 wherein the hydrophobizing agent is selected from the group comprising reactive hydrophobizing agents and blends of reactive hydrophobizing agents with each other and with non-reactive hydrophobizing agents.

19. The method of claim 18 wherein the plant glycoside is selected from the group comprising glycosides whose aglycone portion is selected from the group comprising benzopyrone-based, triterpenoid-based, and steroid-based structures.

20. The method of claim 18 wherein the plant glycoside is selected from the group comprising glycosides whose aglycone portion is selected from the group comprising benzopyrone-based, triterpenoid-based, and steroid-based structures.

* * * * *